United States Patent [19]
Tamura et al.

[11] Patent Number: 4,681,227
[45] Date of Patent: Jul. 21, 1987

[54] CASSETTE FOR STIMULABLE PHOSPHOR SHEET

[75] Inventors: Kaoru Tamura; Shumpeita Torii, both of Kanagawa, Japan

[73] Assignee: Fuji Photo Film Co., Ltd., Kanagawa, Japan

[21] Appl. No.: 719,847

[22] Filed: Apr. 4, 1985

[30] Foreign Application Priority Data

Apr. 4, 1984 [JP] Japan .................................. 59-67290
Apr. 4, 1984 [JP] Japan .................................. 59-67291

[51] Int. Cl.$^4$ ............................................. B65D 81/30
[52] U.S. Cl. .................................... 206/455; 206/523; 206/594; 378/182
[58] Field of Search ............... 206/454, 455, 521, 523, 206/594; 387/182, 188

[56] References Cited

U.S. PATENT DOCUMENTS

| 1,792,626 | 2/1931 | Bowersock | 206/594 |
|---|---|---|---|
| 3,017,023 | 1/1962 | Peterman et al. | 206/594 |
| 3,018,015 | 1/1962 | Agriss et al. | 206/521 |
| 3,145,837 | 8/1964 | Lewis et al. | 206/594 |
| 3,371,208 | 2/1968 | Brackett et al. | 206/454 |
| 3,511,990 | 5/1970 | Hauss | 206/455 |
| 4,093,010 | 6/1978 | Hunley et al. | 206/523 |
| 4,339,039 | 7/1982 | Mykleby | 206/523 |
| 4,467,919 | 8/1984 | Bengtsson et al. | 206/455 |

Primary Examiner—William Price
Assistant Examiner—Brenda J. Ehrhardt
Attorney, Agent, or Firm—Sughrue, Mion, Zinn, Macpeak and Seas

[57] ABSTRACT

A cassette for removably housing a stimulable phosphor sheet for storing a radiation image therein comprises a lining member secured to the inner surface of a rear cover of the cassette. The lining member comprises a cushioning material layer and an embossed resin sheet or a slide material layer overlaid on the front surface of the cushioning material layer. At least a part of the peripheral portion of the lining member is cut away, and a cavity is formed at the cutaway portion so that the stimulable phosphor sheet readily separates from the rear cover when the rear cover is opened upwardly.

6 Claims, 9 Drawing Figures

CASSETTE FOR STIMULABLE PHOSPHOR SHEET

BACKGROUND OF THE INVENTION

1. Field of the Invention

This invention relates to a cassette for housing a stimulable phosphor sheet.

2. Description of the Prior Art

When certain kinds of phosphors are exposed to a radiation such as X-ray, $\alpha$-ray, $\beta$-ray, $\gamma$-ray, cathode rays or cathod-rays or ultra-violet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet or simply as a sheet) is first exposed to a radiation passing through an object to have a radiation image stored therein, and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image on a recording medium such as a photographic light-sensitive material or on a display device such as a cathode ray tube (CRT).

The stimulable phosphor sheet used in the aforesaid radiation image recording and reproducing system is usually handled in the form housed in a cassette. Specifically, at the radiation image recording step, the stimulable phosphor sheet is used in the form housed in the cassette and is exposed to a radiation passing through an object and the cassette to have a radiation image of the object stored therein. After the radiation image recording step, the stimulable phosphor sheet is conveyed to a predetermined sheet taking-out position in the form housed in the cassette.

The cassette must be fabricated so that it removably houses the stimulable phosphor sheet and maintains the housed sheet in the condition shielded from light. This is because the stimulable phosphor sheet is loaded into the cassette and used in this form for image recording, and read-out of the image stored in the stimulable phosphor sheet is carried out by taking the stimulable phosphor sheet out of the cassette and exposing the sheet to stimulating rays which cause the sheet to emit light in proportion to the stored radiation energy. Further, the stimulable phosphor sheet must be maintained in the condition shielded from light between the image recording step and the image read-out step so that the sheet is not exposed to light which cause the sheet to emit light prior to image read-out.

FIG. 1 is a partially cutaway perspective view showing the conventional cassette for housing a stimulable phosphor sheet. The cassette comprises a front cover 1 and a rear cover 2 openably joined by a hinge 3, and resilient cushioning materials 4 and 5, which are made of a foamed synthetic resin material, a foamed synthetic rubber material or the like, are respectively secured to the inner surfaces of the front cover 1 and the rear cover 2. The cushioning material 4 secured to the inner surface of the front cover 1 has a recess portion 7 for receiving a stimulable phosphor sheet 6.

FIG. 2 is a schematic view showing the manner in which the cassette is used for recording a radiation image. In the radiation image recording step, the cassette housing the stimulable phosphor sheet 6 and closed by a latch 22 so that the front cover 1 and the rear cover 2 do not open is positioned as shown in FIG. 2. A radiation emitted by a radiation source 20 passes through an object 21 and then the front cover 1. Thus the stimulable phosphor sheet 6 is exposed to the radiation to have a radiation image of the object 21 stored in a stimulable phosphor layer 6a overlaid on a substrate 6b of the stimulable phosphor sheet 6.

The cushioning materials 4 and 5 secured to the inner surfaces of the front cover 1 and the rear cover 2 of the cassette exhibit adequate resiliency and hold the stimulable phosphor sheet 6 therebetween at a predetermined pressure so that the sheet 6 does not move in the cassette. Also, the cushioning materials 4 and 5 protect the stimulable phosphor sheet 6 so that the surface of the sheet 6 does not come into contact with the inner surface of the front cover 1 or the rear cover 2 of the cassette and is not scratched thereby when the sheet 6 is inserted into or taken out of the cassette.

FIG. 3 is a schematic view showing the manner in which the stimulable phosphor sheet 6 is inserted into the cassette. The cassette is positioned so that the front cover 1 having the sheet receiving recess portion 7 faces down, and the rear cover 2 is opened upwardly. The stimulable phosphor sheet 6 is delivered and inserted in the direction as indicated by the arrow by use of a sheet loader using rollers 30 or the like. In this case, no problem arises if the stimulable phosphor sheet 6 is always delivered in the correct direction as indicated by the arrow. However, actually, the sheet delivery direction changes due to various causes, for example, as indicated by the chain line. In this case, an upper corner portion 6c at the front end of the stimulable phosphor sheet 6 comes into contact with the cushioning material 5 inside of the rear cover 2. Since the cushioning material 5 exhibits adequate resiliency, the cushioning material 5 is depressed by the corner portion 6c of the stimulable phosphor sheet 6. As a result, the corner portion 6c is caught by the depressed portion of the cushioning material 5, and the stimulable phosphor sheet 6 cannot be smoothly inserted into the cassette or the sheet insertion becomes impossible.

When the stimulable phosphor sheet 6 is taken out of the cassette, the cassette is positioned with the front cover 1 facing down, and the rear cover 2 is opened upwardly. The stimulable phosphor sheet 6 (not shown in FIG. 3) present in the sheet receiving recess portion 7 inside of the front cover 1 is taken up by use of a sucking disk 31 of an air suction arm. When the surface of the cushioning material 5 inside of the rear cover 2 is smooth and in close contact with the stimulable phosphor sheet 6 without air intervening therebetween, the sheet 6 is moved up in close contact with the cushioning material 5 as the rear cover 2 is opened upwardly for taking out the sheet 6. Or, the stimulable phosphor sheet 6 is slightly raised together with the rear cover 2 and then falls to a position deviated from the sheet receiving recess portion 7. Thus sheet taking out cannot be performed smoothly or becomes impossible.

SUMMARY OF THE INVENTION

The primary object of the present invention is to provide a cassette for a stimulable phosphor sheet, which holds the stimulable phosphor sheet in a correct position by pushing it at an adequate pressure when the cassette is closed.

Another object of the present invention is to provide a cassette for a stimulable phosphor sheet, in which the sheet is inserted smoothly so that the front end of the sheet is not caught by the inner surface of the cassette.

The specific object of the present invention is to provide a cassette for a stimulable phosphor sheet, in which the sheet is smoothly taken out of the cassette without being raised together with the rear cover of the cassette when the rear cover is opened upwardly.

The present invention provides a cassette for removably housing a stimulable phosphor sheet for storing a radiation image therein, the cassette comprising a lining member secured to the inner surface of a rear cover of said cassette, said lining member comprising a cushioning material layer and a resin sheet overlaid on the front surface of said cushioning material layer, the surface of said resin sheet being embossed.

The present invention also provides a cassette for removably housing a stimulable phosphor sheet for storing a radiation image therein, the cassette comprising a lining member secured to the inner surface of a rear cover of said cassette, said lining member comprising a cushioning material layer and a slide material layer overlaid on the front surface of said cushioning material layer, at least a part of the peripheral portion of said lining member being cut away, and a cavity section being formed at said cutaway portion.

In the cassette of the present invention, since the lining member provided with the cushioning material layer is secured to the inner surface of the rear cover, it is possible to hold the stimulable phosphor sheet in the correct position by the resilient pushing force of the cushioning material layer so that the stimulable phosphor sheet does not move in the cassette.

Further, the resin sheet or the slide material layer is overlaid on the front surface of the cushioning material layer. Therefore, even when the front end of the stimulable phosphor sheet comes into contact with the lining member at the sheet inserting step, the front end portion of the stimulable phosphor sheet smoothly slides on the resin sheet or the slide material layer without being caught by the lining member. Thus it is possible to insert the stimulable phosphor sheet smoothly into the cassette.

In the cassette of the present invention wherein the lining member is provided with the embossed resin sheet, since air always intervenes at emboss concavities between the lining member and the stimulable phosphor sheet, the stimulable phosphor sheet does not completely come into contact with the lining member, and readily separates from the rear cover when the rear cover is opened upwardly.

Also, in the cassette of the present invention wherein at least a part of the peripheral portion of the lining member provided with the slide material layer is cut away so that a cavity section is formed at the cutaway portion, a part of the peripheral portion of the stimulable phosphor sheet housed in the cassette remains non-contacted with the lining member at the cavity section. When the rear cover is opened upwardly, air enters between the stimulable phosphor sheet and the lining member from the peripheral portion of the stimulable phosphor sheet positioned at the cavity section. Therefore, the stimulable phosphor sheet readily separates from the rear cover.

DESCRIPTION OF THE PREFERRED EMBODIMENTS

The present invention will hereinbelow be described in further detail with reference to the accompanying drawings.

Figure 1:
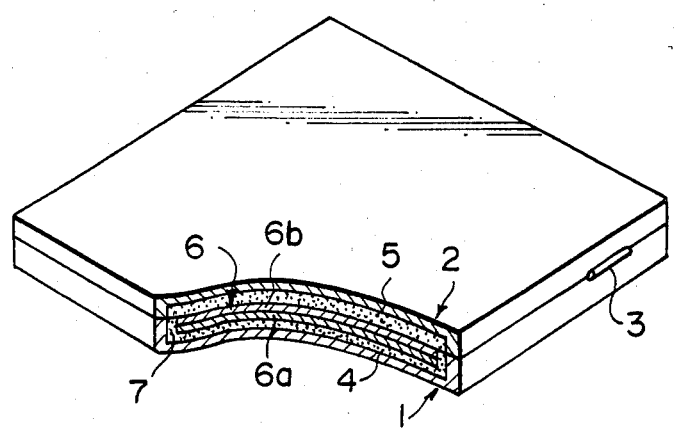
FIG. 1 is a partially cutaway perspective view showing the conventional cassette for housing a stimulable phosphor sheet.
Figure 4:
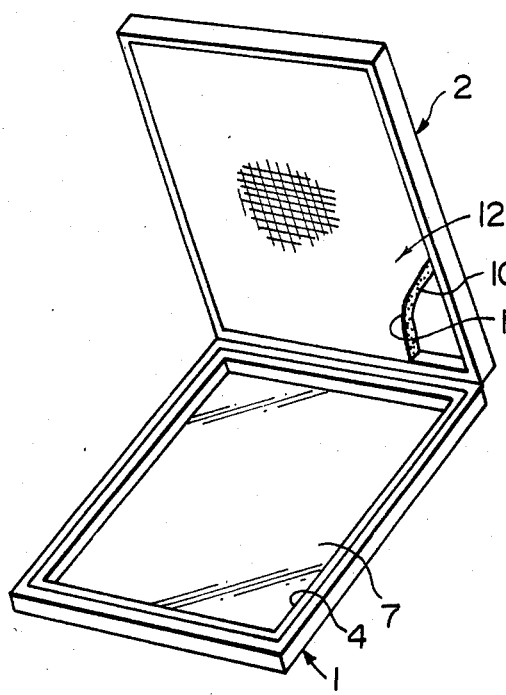
FIGS. 4 and 6 are perspective views showing embodiments of the cassette in accordance with the present invention.

FIG. 4 shows an embodiment of the cassette in accordance with the present invention, which has a structure similar to that of the conventional cassette as shown in FIG. 1 except for the configuration of the lining member secured to the inner surface of the rear cover. A front cover 1 and a rear cover 2 are openably joined with a hinge (not shown) or the like. A cushioning material 4 fabricated of a foamed synthetic resin (foamed polyethylene material) is secured to the inner surface of the front cover 1. The cushioning material 4 is provided with a sheet receiving recess portion 7 having approximately the same size as the size of a stimulable phosphor sheet 6 (not shown) for receiving the stimulable phosphor sheet 6. A lining member 12 comprising a cushioning material layer 10 fabricated of a foamed synthetic resin material (foamed polyurethane material) and a resin sheet 11, e.g. a polyvinyl chloride sheet, overlaid on the front surface of the cushioning material layer 10 is secured to the inner surface of the rear cover 2. The resin sheet 11 is embossed over the whole surface.

Figure 5:
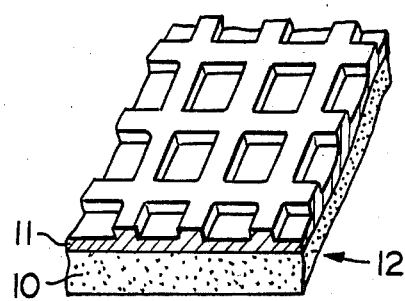
FIG. 5 is a perspective view showing an example of the lining member employed in the embodiments of FIGS. 4 and 6, FIGS. 7 and 9 are perspective views showing further embodiments of the cassette in accordance with the present invention.

FIG. 5 is an enlarged perspective view showing the lining member 12 provided with the embossed resin sheet 11. As shown, a fine lattice-like emboss pattern is formed on the surface of the resin sheet 11.

Figure 6:
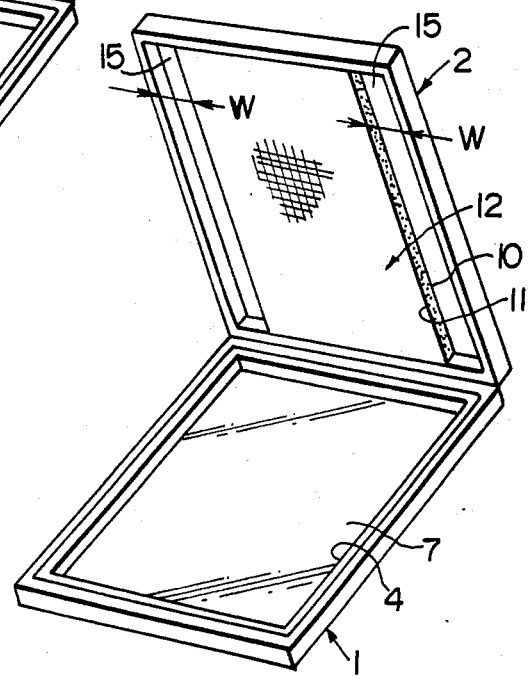

FIG. 6 shows another embodiment of the cassette in accordance with the present invention, wherein the lining member 12 as shown in FIG. 5 is employed. In this embodiment, both side end portions of the lining member 12 are cut away by a predetermined width W over the whole length of the lining member 12, and cavity portions are formed at the cutaway portions 15, 15. The positions of the cutaway portions 15, 15 are not limitd to the side end portions of the lining member 12, and any peripheral portions of the lining member 12 may be cut away.

Figure 2:
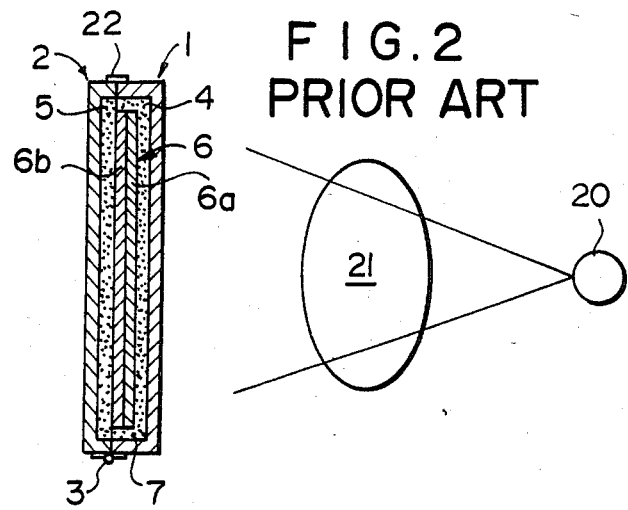
FIG. 2 is a schematic view showing the manner in which the cassette is used for recording a radiation image.
Figure 3:
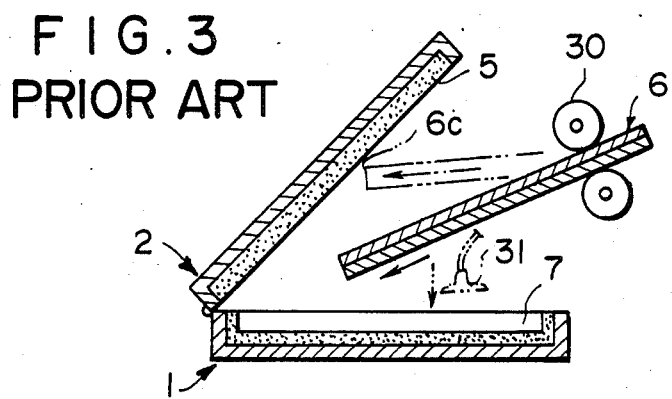
FIG. 3 is a schematic view showing the manner in which the stimulable phosphor sheet is inserted into the cassette.

By "rear cover" is meant the cover opened upwardly when the stimulable phosphor sheet is inserted into or taken out of the cassette. The rear cover is not limited to the cover positioned on the rear side with respect to the radiation source as shown in FIG. 2.

By "cushioning material layer" is meant a layer of a soft material exhibiting adequate resiliency for holding the stimulable phosphor sheet in the correct position by pressing it at an adequate pressure when the front cover and the rear cover are closed with the stimulable phosphor sheet housed in the cassette. In addition to the foamed synthetic resin, a foamed synthetic rubber material or the like may be used as the material of the cushioning material layer.

By "resin sheet" is meant a sheet of a synthetic resin such as polyvinyl chloride resin. The resin sheet exhibits rigidity higher than the rigidity of the cushioning material layer and has such property that the front end of the stimulable phosphor sheet smoothly slides on the resin sheet. The resin sheet is overlaid on the front surface of the cushioning material layer for preventing the stimulable phosphor sheet from being caught by the cushioning material layer when the stimulable phosphor sheet is inserted into the cassette.

Embossing of the resin sheet is a processing for forming a fine emboss pattern on the surface of the resin sheet and is normally conducted as a step of the resin sheet making process. The emboss pattern may be of various types, for example, a lattice-like pattern, a satin-like pattern, a cordovan-like pattern, and a grazed pattern. The resin sheet is embossed so that the stimulable phosphor sheet is not completely contacted with the lining member with air intervening at emboss concavities between the stimulable phosphor sheet and the lining member when the stimulable phosphor sheet is housed in the cassette and the rear cover is closed, whereby the stimulable phosphor sheet is prevented from being moved up together with the rear cover when the rear cover is opened upwardly. The emboss pattern may be of any type insofar as this purpose is accomplished.

The lining member is cut away as described above for the purpose of forming the cavity sections at the cutaway portions and allowing air to exist at the cavity sections, thereby ensuring together with the emboss pattern of the resin sheet that the stimulable phosphor sheet is prevented from completely contacting the lining member over the whole surface and from being moved up together with the rear cover when the rear cover is opened upwardly. Therefore, it is necessary that the cutaway portions are present at least at positions standing face to face with the peripheral portions of the stimulable phosphor sheet, preferably at positions standing face to face with the side end portions of the stimulable phosphor sheet instead of the upper and lower end portions thereof. Since the purpose of the cutaway portions is to form cavity sections standing face to face with the stimulable phosphor sheet, only the resin sheet may be cut away when the resin sheet has a comparatively large thickness.

Figure 7:
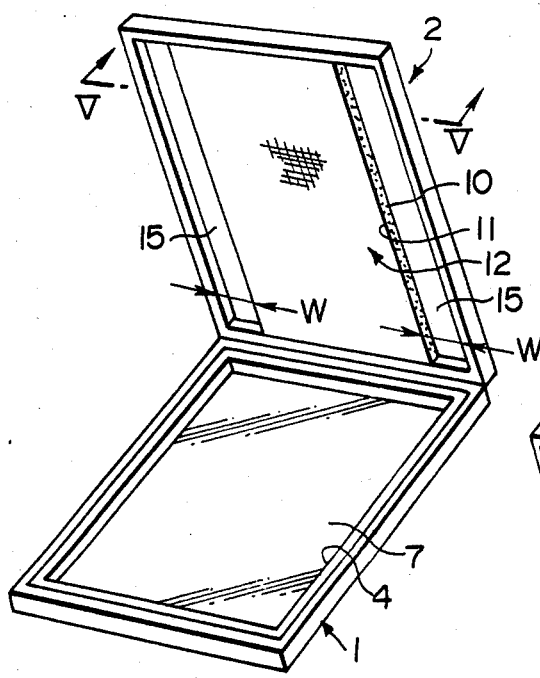
Figure 8:
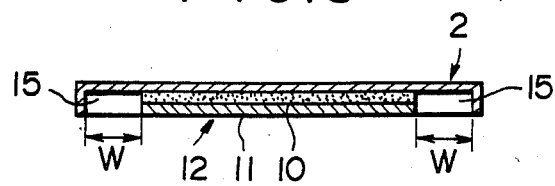
FIG. 8 is a sectional view taken along line V—V of FIG. 7.

FIG. 7 shows a further embodiment of the cassette in accordance with the present invention, which is similar to the embodiment of FIG. 6 except that, instead of the resin sheet 11, a slide material layer 11 constituted by a polyvinyl chloride sheet is overlaid on the front surface of the cushioning material layer 10. As shown in FIGS. 7 and 8, both side end portions of the lining member 12 are cutaway by the predetermined width W over the entire length thereof, and cavity sections are formed at the cutaway portions 15.

Figure 9:
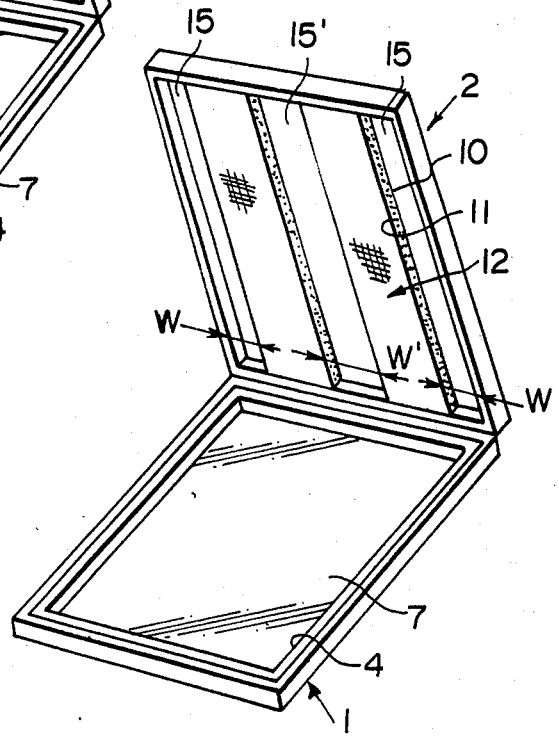

FIG. 9 shows a still further embodiment of the cassette in accordance with the present invention, which is similar to the embodiment of FIG. 7 except that the lining member 12 is cut away also at the center thereof by a predetermined width W' over the entire length of the lining member 12 to form a cutaway portion 15' in addition to the cutaway portions 15, 15 at both side end portions.

By "slide material layer" is meant a layer constituted by a material exhibiting rigidity higher than the rigidity of the cushioning material layer and having such property that the front end of the stimulable phosphor sheet readily slides on the material, and overlaid on the front surface of the cushioning material layer for preventing the front end of the stimulable phosphor sheet from being caught by the cushioning material layer. The material is not limited to the polyvinyl chloride sheet, and any non-foamed material such as a synthetic resin sheet, velvet, felt or wear-proof paper may be used.

Since the purpose of the cutaway portions is to form cavity sections standing face to face with the stimulable phosphor sheet, only the slide material layer may be cut away when the slide material layer has a comparatively large thickness.

We claim:

1. A cassette for removably housing a stimulable phosphor sheet for storing a radiation image therein, said cassette comprising a lining member secured to the inner surface of a rear cover of said cassette, said lining member comprising a cushioning material layer and a resin material layer, the surface of said resin sheet facing said phosphor sheet being embossed, whereby said phosphor sheet may be smoothly inserted into said cassette and said sheet will not stick to the inner surface of said rear cover upon opening said cassette for removal of said sheet.

2. A cassette as defined in claim 1 wherein said lining member is cut away at least at a part of the peripheral portions of said lining member for forming a cavity section at said cutaway portion.

3. A cassette as defined in claim 2 wherein said lining member is cut away by a predetermined width over the entire length of said lining member at both side end portions of said lining member.

4. A cassette for removably housing a stimulable phosphor sheet for storing a radiation image therein, said cassette comprising a lining member secured to the inner surface of a rear cover of said cassette, said lining member comprising a cushioning material layer and a slide material layer overlaid on the front surface of said cushioning material layer, at least a part of the peripheral portion of said lining member being cut away, and a cavity section being formed at said cutaway portion, whereby said phosphor sheet may be smoothly inserted into said cassette-and said sheet will not stick to the inner surface of said rear cover upon opening said cassette for removal of said sheet.

5. A cassette as defined in claim 4 wherein said lining member is cut away by a predetermined width over the entire length of said lining member at both side end portions of said lining member.

6. A cassette as defined in claim 4 wherein said lining member is cut away by a predetermined width over the entire length of said lining member at both side end portions and the center of said lining member.

* * * * *